(12) United States Patent
Socolsky et al.

(10) Patent No.: US 10,588,275 B2
(45) Date of Patent: Mar. 17, 2020

(54) IRRIGATION SYSTEM

(71) Applicant: Netafim, Ltd., Tel Aviv (IL)

(72) Inventors: Esteban Socolsky, Kibbutz Hatzerim (IL); Ron Keren, Kibbutz Hatzerim (IL)

(73) Assignee: Netafim, Ltd., Tel Aviv (IL)

( * ) Notice: Subject to any disclaimer, the term of this patent is extended or adjusted under 35 U.S.C. 154(b) by 79 days.

(21) Appl. No.: 16/066,750

(22) PCT Filed: Dec. 25, 2016

(86) PCT No.: PCT/IB2016/058001
§ 371 (c)(1),
(2) Date: Jun. 28, 2018

(87) PCT Pub. No.: WO2017/115263
PCT Pub. Date: Jul. 6, 2017

(65) Prior Publication Data
US 2018/0352759 A1  Dec. 13, 2018

Related U.S. Application Data

(60) Provisional application No. 62/271,349, filed on Dec. 28, 2015.

(51) Int. Cl.
*A01G 25/16* (2006.01)
*A01G 25/02* (2006.01)

(52) U.S. Cl.
CPC ............ *A01G 25/16* (2013.01); *A01G 25/02* (2013.01); *Y02A 40/237* (2018.01)

(58) Field of Classification Search
CPC ...... A01G 25/023; A01G 25/06; A01G 25/16; A01G 25/02; Y02A 40/237
USPC ..................................... 239/1, 542
See application file for complete search history.

(56) References Cited

U.S. PATENT DOCUMENTS

| | | |
|---|---|---|
| 4,031,915 A | 6/1977 | McElhoe et al. |
| 4,917,535 A | 4/1990 | Prassas |
| 5,535,778 A | 7/1996 | Zakai |
| 9,291,276 B2 | 3/2016 | Keren |
| 2013/0220437 A1 | 8/2013 | Dean, Jr. et al. |
| 2014/0014202 A1 | 1/2014 | Keren |

OTHER PUBLICATIONS

International Search Report dated Apr. 26, 2017, in counterpart International (PCT) Application No. PCT/IB2016/058001.
Written Opinion dated Apr. 26, 2017, in counterpart International (PCT) Application No. PCT/IB2016/058001.

*Primary Examiner* — Christopher S Kim
(74) *Attorney, Agent, or Firm* — Womble Bond Dickinson (US) LLP

(57) ABSTRACT

A drip irrigation system includes a distribution pipe and drip irrigation pipes that branch off in communication with the distribution pipe. Each drip pipe has a flushing valve coupled to a downstream end and at least some of the drip pipes each have an inlet valve coupled to an upstream end for communication with the distribution pipe. The system further has at least one command valve in communication with the distributing pipe and also with at least some of the inlet vales, wherein opening of the command valve is configured to close the at least some inlet valves.

27 Claims, 9 Drawing Sheets

IRRIGATION SYSTEM

RELATED APPLICATIONS

This is a 35 USC 371 U.S. National Phase of International Application No. PCT/M2016/058001 filed 25 Dec. 2016 and published in English as WO 2017/115263A1 on 6 Jul. 2017, which claims priority to U.S. Provisional application No. 62/271,349, filed 28 Dec. 2015. The contents of the aforementioned applications are incorporated by reference in their entirety.

TECHNICAL FIELD

Embodiments of the present invention relate to irrigation systems and methods, and in particular to such systems and methods including valves for controlling and/or affecting the flow of liquid through the systems.

BACKGROUND

Irrigation systems employing drip irrigation lines may include valves for allowing liquid to flow through the drip lines of the system. Such valves for example may include flushing valves that are installed at an end of a drip line for affecting flushing of the line.

U.S. Pat. No. 5,535,778, the disclosure of which is incorporated herein by reference, relates to a self-closing valve that is used for flushing irrigation lines. This valve has an inlet portion that communicates with water of an irrigation line, and an elastic membrane that divides an enclosed space in the valve into upstream and downstream compartments. The valve has a passage between the compartments and a discharge opening in the upstream compartment. Flow of water from the upstream compartment flowing into the downstream compartment flexes the membrane in the upstream direction until it closes against the discharge opening to end flushing and remain closed as long as it is exposed to upstream pressurized water from the irrigation line. Upon drop and cessation of the upstream pressure, the membrane will return to its un-flexed state and the valve will be ready for a subsequent flushing action that will begin when exposed again to an upstream pressurized water in the irrigation line.

WO2012131503 which corresponds to US 2014014202, the disclosure of which is incorporated herein by reference, is an example of an eternally controlled valve that has a liquid passage, a sealing diaphragm and a control port that can receive pressurized control signals. The sealing diaphragm is adapted to seal the passage, where upon receipt of a control signal the sealing diaphragm bends and opens a path for liquid around the sealing diaphragm that can flow downstream. Cessation of the control signal will allow the valve to return back to a close state where pressurized liquid upstream is stopped from flowing downstream.

In irrigation systems employing a plurality of valves, each controlling liquid flow into and/or out of a section of the system, variance in the liquid flow rate through the system may depend on the amount of valves that are activated to open during the same period of time. The larger the number of valves that open simultaneously the larger the variance in flow rate that the system must be designed to support.

SUMMARY

The following embodiments and aspects thereof are described and illustrated in conjunction with systems, tools and methods which are meant to be exemplary and illustrative, not limiting in scope.

In an embodiment there is provided a drip irrigation system comprising a distribution pipe and drip irrigation pipes branching off from communication with the distribution pipe. Communication with the distribution pipe may mean direct communication or communication via irrigation devices such as valves. Each drip pipe comprises a flushing valve coupled to a downstream end and at least some of the drip pipes comprising each an inlet valve coupled to an upstream end for communication with the distribution pipe. The flushing valves may be of a self-closing type adapted to start a flushing action when exposed to upstream liquid pressure and then gradually close a flushing orifice until completely closing. Alternatively, the flushing valves may be of a type adapted to open and close upon receipt of receptive commands, preferably incoming pressure commands. The system further comprising at least one command valve in communication with the distributing pipe and with at least some of the inlet vales, wherein opening of the command valve is configured to close the at least some inlet valves.

In an embodiment, the at least one command valve is also in communication with flushing valves not belonging to drip pipes including inlet valves it already communicates with, and wherein the opening of the command valve is configured to also open the flushing valves in communication with the command valve. The irrigation system thus may comprise a plurality of drip pipes extending possibly alongside the other, with a first group of drip pipes having possibly only their inlet valves in communication with a given first command valve and another second group of drip pipes having possibly only their flushing valves in communication with the given first command valve. Possibly, another second command valve provided in the system may be in communication with the flushing valves of the first group of drip pipes and in communication with the inlet valves of the second group of drip pipes.

In accordance with an aspect of the present invention there is also provided a method of irrigation comprising the steps of: providing an irrigation system comprising a distribution pipe and drip irrigation pipes branching off from communication with the distribution pipe, each drip pipe comprises a flushing valve coupled to a downstream end and at least some of the drip pipes comprising each an inlet valve coupled to an upstream end for communication with the distribution pipe, providing at least one command valve for the system in communication with the distributing pipe and with at least some of the inlet vales, wherein opening of the command valve allows liquid pressure to be communicated downstream to close the inlet valves in communication therewith. Possibly, an initial state of the system may be configured to include the command valve in an open state, or alternatively the command valve in an initial state me be configured to be in a closed state.

In addition to the exemplary aspects and embodiments described above, further aspects and embodiments will become apparent by reference to the figures and by study of the following detailed descriptions.

BRIEF DESCRIPTION OF THE FIGURES

Exemplary embodiments are illustrated in referenced figures. It is intended that the embodiments and figures disclosed herein are to be considered illustrative, rather than restrictive. The invention, however, both as to organization and method of operation, together with objects, features, and advantages thereof, may best be understood by reference to the following detailed description when read with the accompanying figures, in which.

Figure 1A:
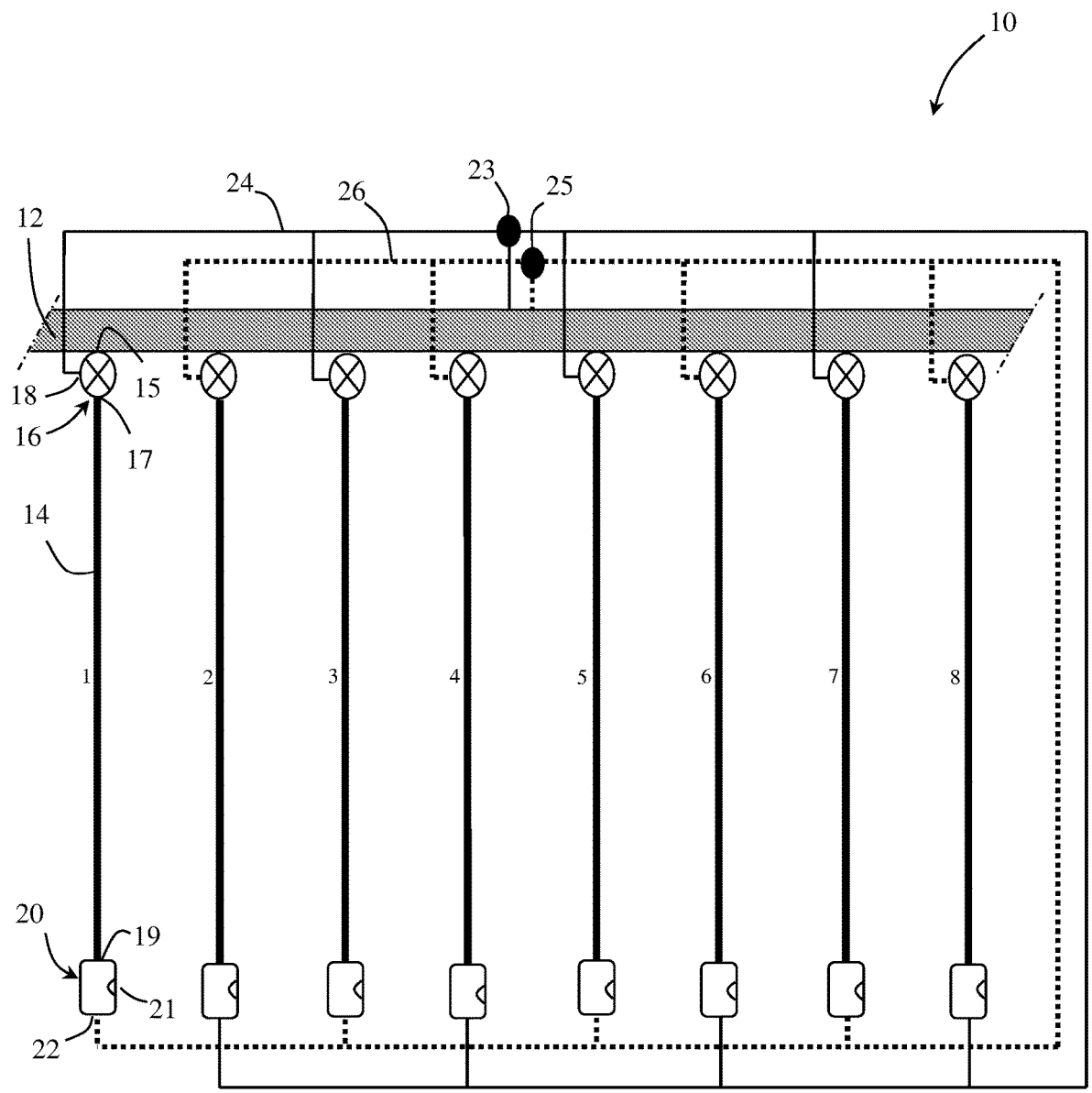
FIGS. 1A to 1D schematically show an irrigation system in accordance with a first embodiment of the present invention, during various stages of an irrigation cycle.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated within the figures to indicate like elements.

DETAILED DESCRIPTION

Attention is first drawn to FIG. 1A illustrating a first embodiment of an irrigation system 10 of the present invention. System 10 includes a distribution pipe 12 and lateral drip irrigation pipes 14 branching off in communication with distribution pipe 12. The pipes 14 have been tagged '1' to '8' from left to right. Each pipe 14 communicates at its upstream end with distribution pipe 12 via an inlet valve 16 and includes at its downstream end an outlet valve 20.

Valve 16 includes an inlet 15 communicating with distribution pipe 12, an outlet 17 communicating downstream with drip pipe 14 and a command port 18 for receiving inlet commands, preferably incoming pressurized commands, for affecting communication through the valve between the inlet 15 and outlet 17.

In an embodiment, valve 16 is a 'normally open' valve configured to provide communication there-through between the inlet 15 and outlet 17 in absence of an incoming command at command port 18; and upon receipt of an incoming command at command port 18 is configured to close and terminate fluid flow downstream via the valve.

Valve 20 includes an inlet 19 communicating with drip pipe 14, an outlet 21 communicating downstream with the surrounding environment outside of the valve (e.g. an end of a field being irrigated) and a command port 22 for receiving inlet commands, preferably incoming pressurized commands, for affecting communication through the valve between the inlet 19 and outlet 21.

In an embodiment, valve 20 is a 'normally closed' valve configured to close and seal fluid flow downstream via the valve between the inlet 19 and outlet 21 in absence of an incoming command at command port 22; and upon receipt of an incoming command at command port 22 is configured to provide communication there-through between the inlet 19 and outlet 21 to the outside environment. An example of a valve that may be used as valve 20 is described in WO2012131503 which corresponds to US2014014202, the disclosure of which is incorporated herein by reference.

System 10 includes command valves; here two command valves 23 and 25, communicating each via a respective command network 24, 26 with the system 10 for affecting liquid flow there-through. Command network 24 is illustrated by a network of 'continuous' lines and command network 26 is illustrated by a network of 'dotted' lines.

Command valve 23 communicates via an inlet section of network 24 with distribution pipe 12 for receiving from upstream an incoming liquid flow. Command valve 23 also communicates via an outlet section of network 24 with valves associated with the 'odd' tagged drip pipes and the 'even' tagged drip pipes of system 10. With the 'odd' tagged drip pipes communication is with the command ports 18 of the inlet valves 16 attached to said pipes (here the pipes tagged '1', '3', '5', '7'). With the 'even' tagged drip pipes communication is with the command ports 22 of the outlet valves 20 attached to said pipes (here the pipes tagged '2', '4', '6', '8').

Command valve 25 communicates via an inlet section of network 26 with distribution pipe 12 for receiving from upstream an incoming liquid flow. Command valve 25 also communicates via an outlet section of network 26 with valves associated with the 'odd' tagged drip pipes and the 'even' tagged drip pipes of system 10. With the 'odd' tagged drip pipes communication is with the command ports 22 of the outlet valves 20 attached to said pipes (here the pipes tagged '1', '3', '5', '7'). With the 'even' tagged drip pipes communication is with the command ports 18 of the inlet valves 16 attached to said pipes (here the pipes tagged '2', '4', '6', '8').

Figure 1B:
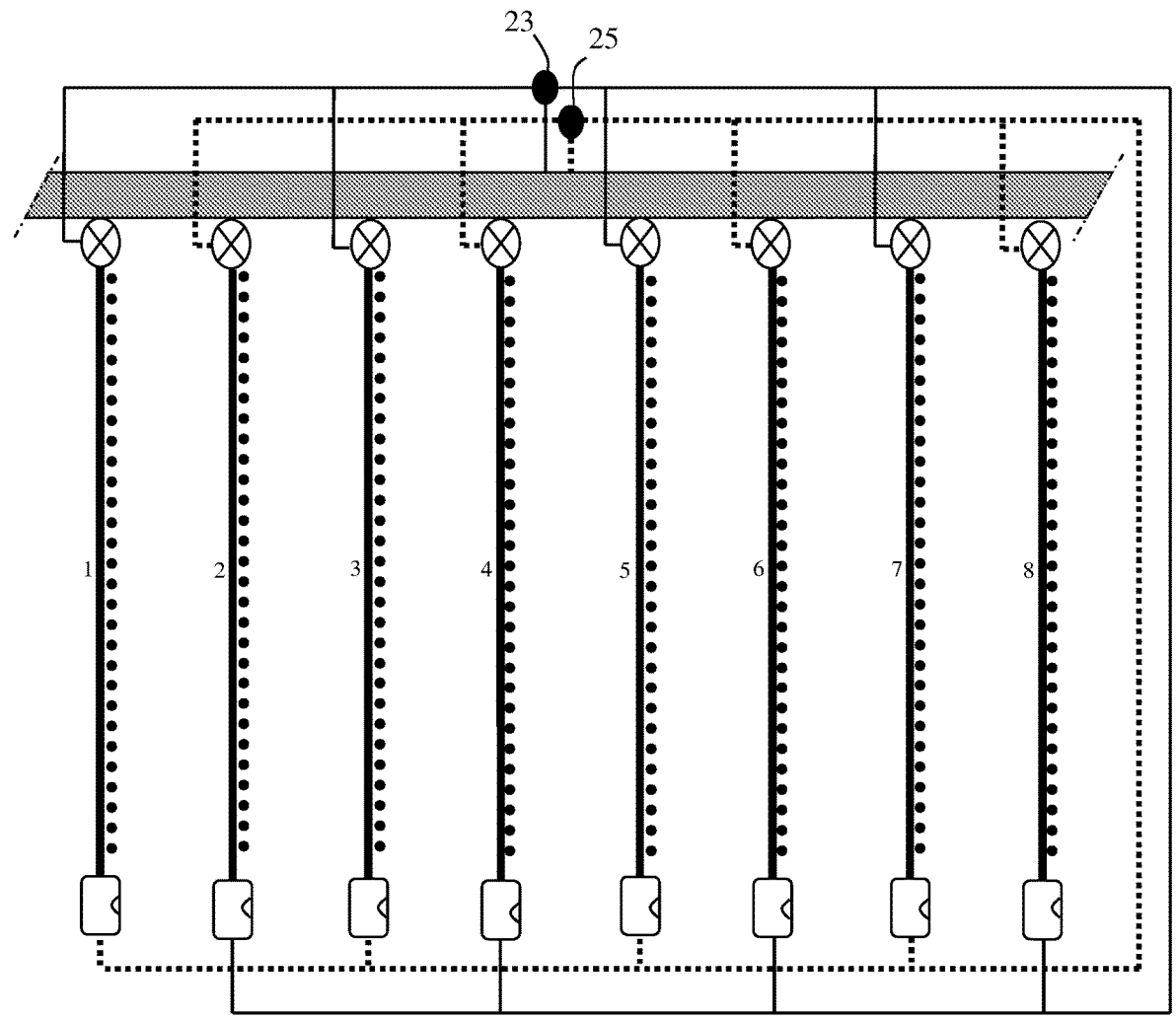

Attention is drawn to FIG. 1B illustrating irrigation system 10 during an irrigation cycle where all the drip pipes 14 are irrigating. The 'drop' like markings alongside each drip pipe 14; illustrate the emitted irrigation by each pipe 14. During an irrigation cycle, distribution pipe is in communication with a liquid source upstream (not shown) for receiving therefrom liquid substances to be irrigated. The command valves 23, 25 are closed as illustrated by the interior 'black filling' of the circles indicating these valves; thereby sealing liquid communicated from distribution pipe 12 via the inlet section of each given valve from flowing downstream via the respective outlet section of the given valve.

The closed states of the valves 23, 25 accordingly result in the command networks 24, 26 being sealed for liquid entering them from upstream from distribution pipe 12. This results in the 'normally open' valves 16 remaining open to allow liquid from distribution pipe 12 to flow downstream into the drip pipes 14. In addition, the 'normally closed' valves 20 remain closed resulting in the drip pipes 14 being closed at their downstream ends consequently urging liquid flowing though the pipes to exit via e.g. apertures formed along the pipes.

Figure 1C:
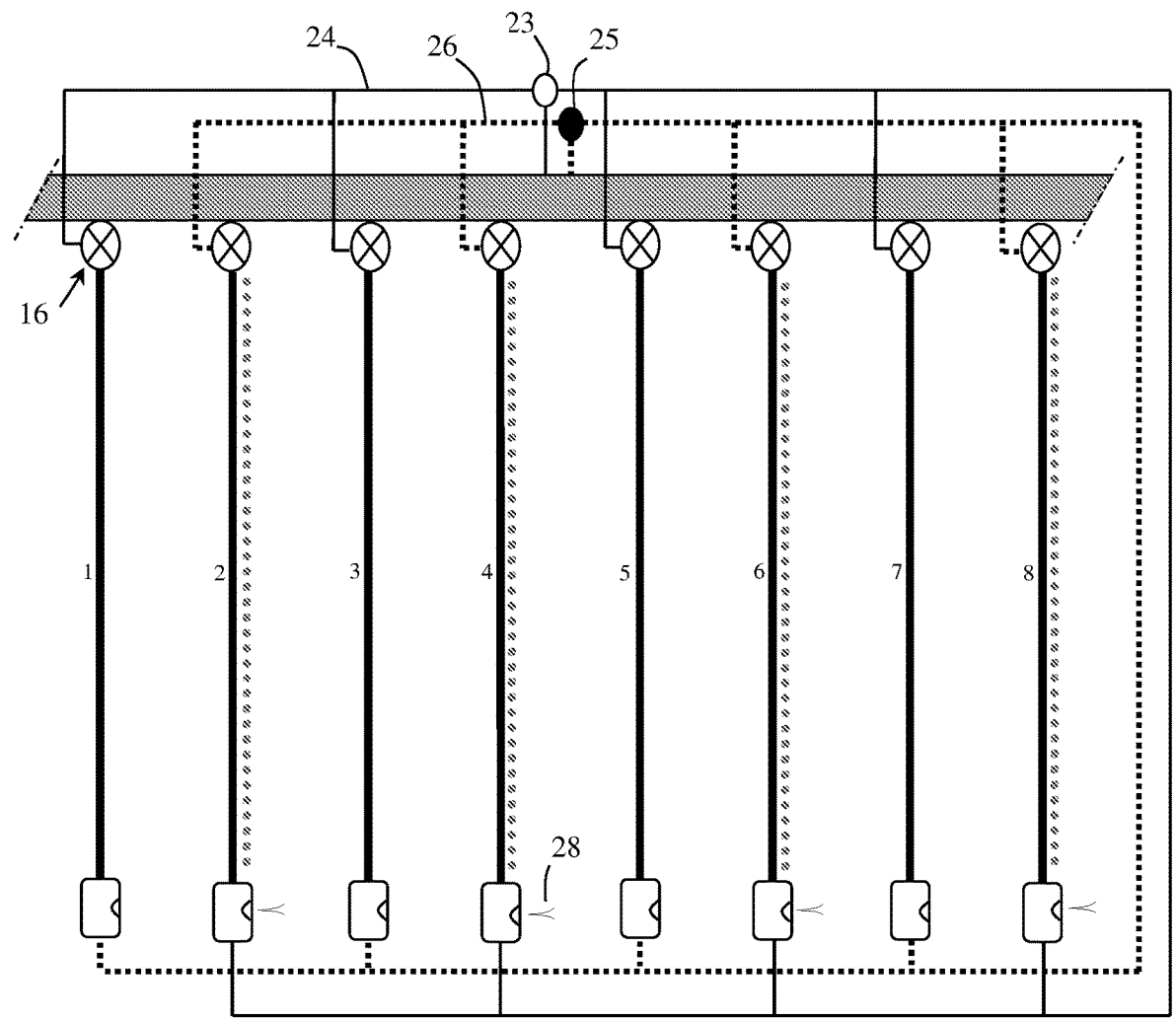
Figure 1D:
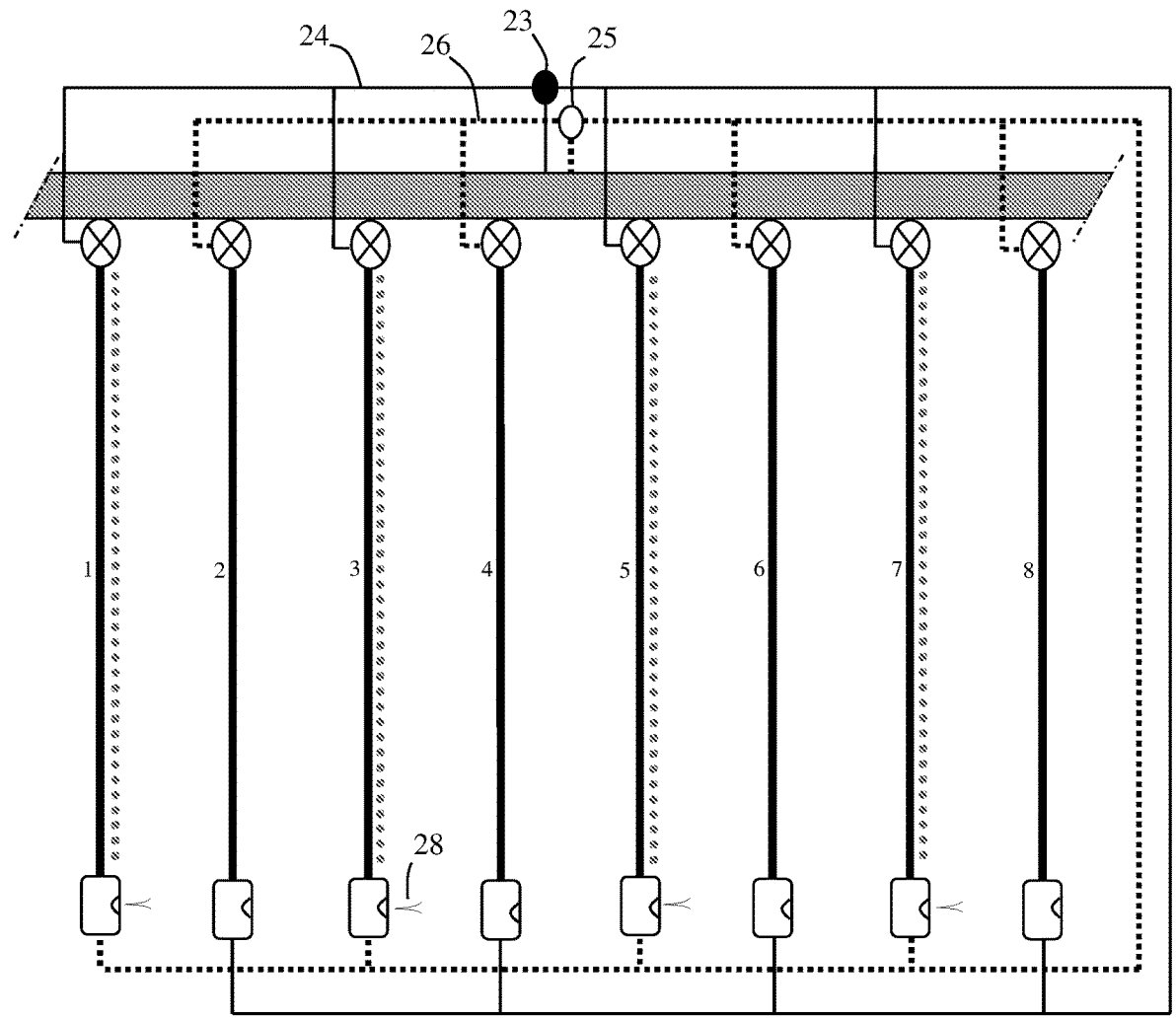

Attention is drawn to FIGS. 1C and 1D illustrating a periodic possible flushing action of the system for cleaning the system's drip pipes 14 from debris or grit that may have accumulated therein.

In FIG. 1C, command valve 23 is seen in an open state as illustrated by the interior 'white filling' of the circle indicating this valve, while command valve 25 is closed. The open state of valve 23 allows liquid from distribution pipe 12 to flow via command network 24 and consequently close the 'normally open' valves 16 attached to the 'odd' tagged pipes 14 to thereby cease downstream flow of liquid into these pipes from distribution pipe 12. The open state of valve 23 allows also liquid from distribution pipe 12 to flow via command network 24 and consequently open the 'normally closed' valves 20 attached to the 'even' tagged pipes 14 to thereby flush liquid from these pipes as illustrated by the markings 28. Possibly during this flushing action, liquid substances may also exit the 'even' tagged pipes 14 therealong, as indicated by the slightly smaller 'drop' like markings alongside each such the 'even' tagged drip pipe 14.

In FIG. 1D, command valve 25 is seen in an open state as illustrated by the interior 'white filling' of the circle indicating this valve, while command valve 23 is closed. The open state of valve 25 allows liquid from distribution pipe 12 to flow via command network 26 and consequently close the 'normally open' valves 16 attached to the 'even' tagged pipes 14 to thereby cease downstream flow of liquid into these pipes from distribution pipe 12. The open state of valve 25 allows also liquid from distribution pipe 12 to flow via command network 26 and consequently open the 'normally closed' valves 20 attached to the 'odd' tagged pipes 14 to thereby flush liquid from these pipes as illustrated by the markings 28. Possibly during this flushing action, liquid substances may also exit the odd' tagged pipes 14 therealong, as indicated by the slightly smaller 'drop' like markings alongside each such the 'odd' tagged drip pipe 14.

Periodic flushing of system 10 may occur at any given desired instance during an irrigation cycle; such as at a relative beginning, middle of ending of an irrigation cycle.

Figure 2A:
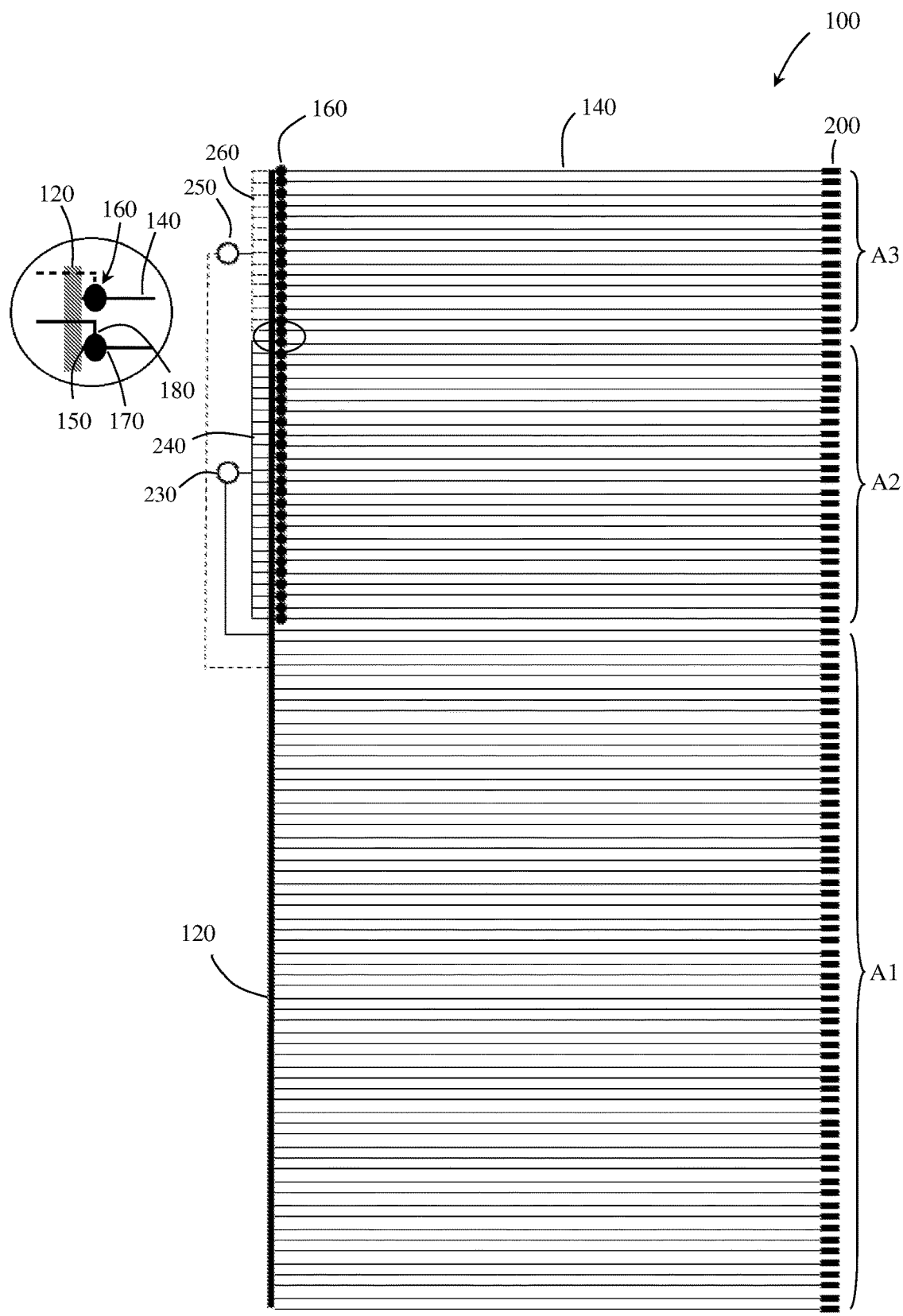
FIGS. 2A to 2E schematically show an irrigation system in accordance with a second embodiment of the present invention, during various stages of an irrigation cycle.

Attention is drawn to FIG. 2A illustrating a second embodiment of an irrigation system 100 of the present invention. System 100 includes a distribution pipe 120 and lateral drip irrigation pipes 140 branching off in communication with distribution pipe 120. The drip pipes 140 are grouped into irrigation sections A1, A2, A3. Each drip pipe 140 in section A1 communicates directly with distribution pipe 120; while in sections A2 and A3 each drip pipe 140 communicates with distribution pipe 120 via a respective inlet valve 160.

Attention is drawn to the enlarged section in FIG. 2A to describe the inlet valves 160. Each valve 160 includes an inlet 150 communicating with distribution pipe 120, an outlet 170 communicating downstream with drip pipe 140 and a command port 180 for receiving inlet commands, preferably incoming pressurized commands, for affecting communication through the valve between the inlet 150 and outlet 170.

In an embodiment, valve 160 is a 'normally open' valve configured to provide communication there-through between the inlet 150 and outlet 170 in absence of an incoming command at command port 180; and upon receipt of an incoming command at command port 180 is configured to close and terminate fluid flow downstream via the valve.

Irrigation system further includes flushing valves 200 at the end of each drip pipe 140. Flushing valve 200 is of a self-closing type including an inlet communicating with liquid arriving from upstream from drip pipe 140. Upstream flow of liquid arriving from drip pipe 140 is configured to be flushed downstream to the outside environment while gradually closing a discharge opening of the valve until the valve closes and a substantial drip irrigation cycle begins. Upon drop and cessation of upstream pressure, the valve returns to its initial state ready for a subsequent flushing action that can begin when exposed again to upstream pressurized liquid in the drip pipe. An example of a valve that may be used as valve 200 is described in U.S. Pat. No. 5,535,778, the disclosure of which is incorporated herein by reference.

System 100 includes also command valves; here two command valves 230 and 250, communicating each via a respective command network 240, 260 with the system 100 for affecting liquid flow there-through. Command network 240 is illustrated by a network of 'continuous' lines and command network 260 is illustrated by a network of 'dotted' lines.

Command valve 230 communicates via an inlet section of network 240 with distribution pipe 120 for receiving from upstream an incoming liquid flow/pressure. Command valve 230 also communicates via an outlet section of network 240 with the valves 160 associated with the drip pipes 140 of irrigation section A2. Command valve 230, in an initial state of system 100 is open as illustrated by the interior 'white filling' of the circle indicating valve 230. Thus, in an initial state of system 100, and when distribution pipe 120 is in communication with a liquid source upstream (not shown); the valves 160 of section A2 are exposed to liquid pressure at their command ports 180 resulting in these valves being maintained closed consequently shutting off liquid from flowing downstream into the drip pipes of section A2.

Command valve 250 communicates via an inlet section of network 260 with distribution pipe 120 for receiving from upstream an incoming liquid flow/pressure. Command valve 250 also communicates via an outlet section of network 260 with the valves 160 associated with the drip pipes 140 of irrigation section A3. Command valve 250, in an initial state of system 100 is open as illustrated by the interior 'white filling' of the circle indicating valve 250. Thus, in an initial state of system 100, and when distribution pipe 120 is in communication with a liquid source upstream (not shown); the valves 160 of section A3 are exposed to liquid pressure at their command ports 180 resulting in these valves being maintained closed consequently shutting off liquid from flowing downstream into the drip pipes of section A3.

Figure 2B:
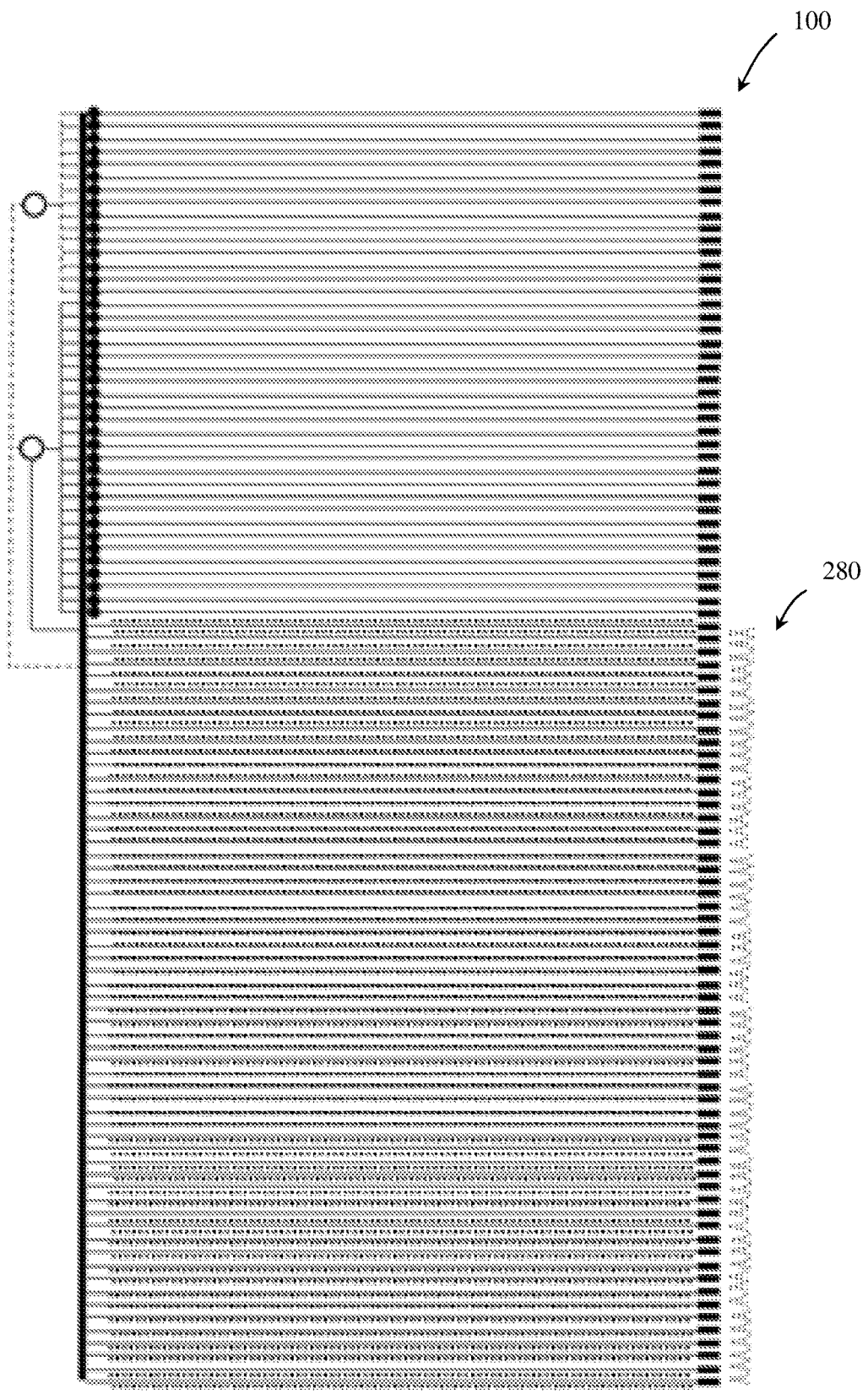

Attention is drawn to FIG. 2B illustrating irrigation system 100 during commencement of an irrigation cycle. The open command valves 230, 250 exposing the valves 160 of sections A2 and A3 to liquid pressure from upstream accordingly stop liquid from flowing into the drip pipes of these sections. However, liquid flowing into the drip pipes of section A1 result in an initial flushing action of these drip pipes as illustrated by the markings 280 seen in FIG. 2B. Possibly during this flushing action, liquid substances may also exit the pipes 14 of section A1 there-along, as indicated by the 'drop' like markings alongside each such drip pipe of section A1.

The self-closing valves 200 in section A1 gradually close until reaching a closed state. In this closed state of the valves 200, section A1's drip pipes either transfer into a drip irrigation action via e.g. apertures formed along the pipes (if they were not previously dripping) or just go on dripping and/or increase their dripping. This can be seen illustrated by the 'drop' like markings in FIG. 2C seen alongside each drip pipe in section A1.

Figure 2C:
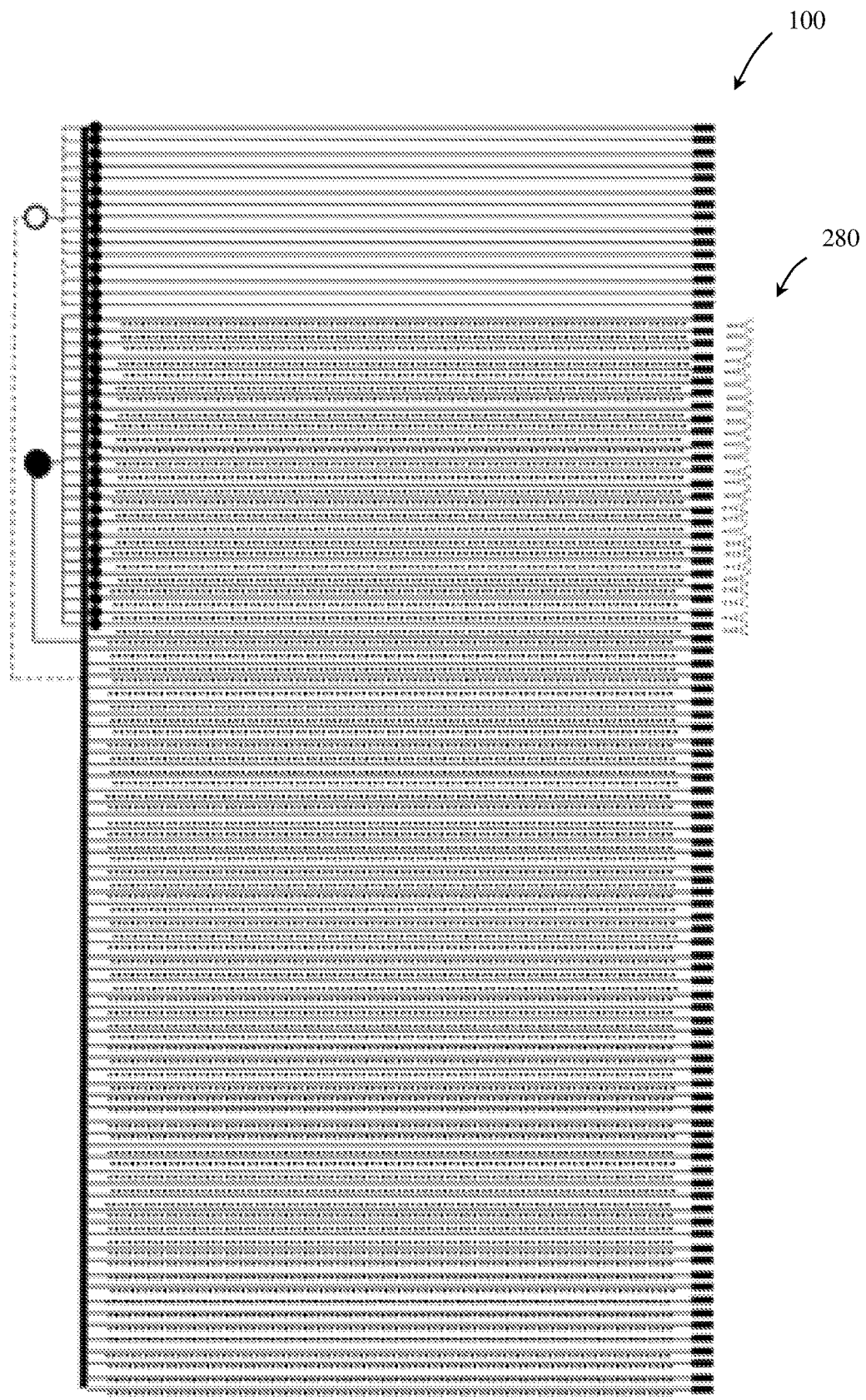

Further in FIG. 2C it is seen that command valve 230 is triggered to a closed state stopping liquid pressure from being communicated to the valves 160 of section A2 from upstream. This enables the valves 160 of section A2 to return to their 'normally open' states consequently allowing liquid to flow downstream into the drip pipes of section A2 to start an initial flushing action of these drip pipes as illustrated by the markings 280 seen in FIG. 2C. Possibly during this flushing action, liquid substances may also exit the pipes 14 of section A2 there-along, as indicated by the 'drop' like markings alongside each such drip pipe of section A2.

The timing of the closing of command valve 230 may preferably be defined as after the valves 200 of section A1 have closed. The self-closing valves 200 in section A2 gradually close until reaching a closed state. In this closed state of the valves 200, section A2's drip pipes either transfer into a drip irrigation action via e.g. apertures formed along the pipes (if they were not previously dripping) or just go on dripping and/or increase their dripping. This can be seen illustrated by the 'drop' like markings in FIG. 2D seen alongside each drip pipe in section A2 in addition to section A1 that remains in its irrigation action.

Figure 2D:
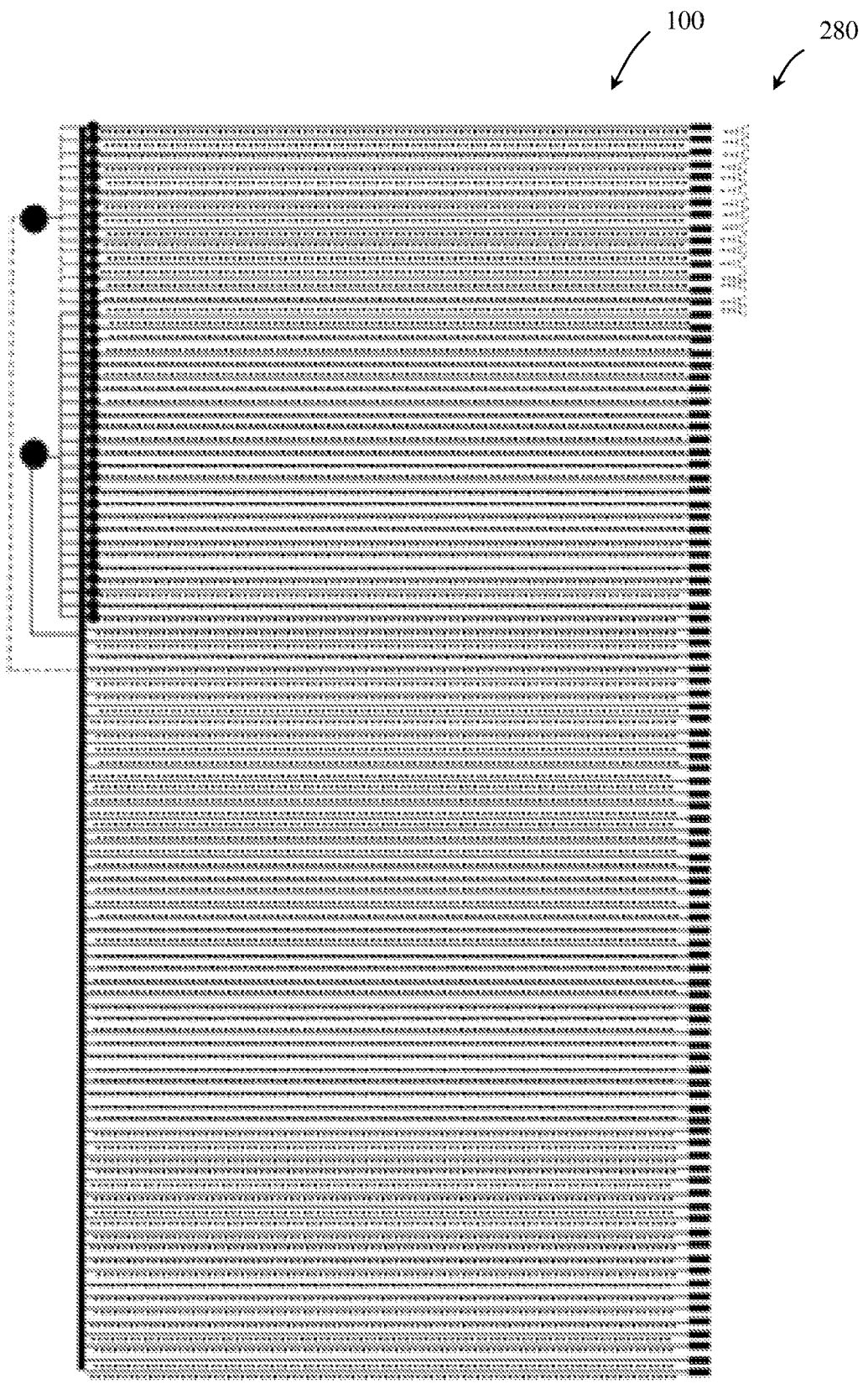

Further in FIG. 2D it is seen that command valve 250 is also triggered to a closed state stopping liquid pressure from being communicated to the valves 160 of section A3 from upstream. This enables the valves 160 of section A3 to also return to their 'normally open' states consequently allowing liquid to flow downstream also into the drip pipes of section A3 to start an initial flushing action of these drip pipes as illustrated by the markings 280 seen in FIG. 2D. Possibly during this flushing action, liquid substances may also exit the pipes 14 of section A3 there-along, as indicated by the 'drop' like markings alongside each such drip pipe of section A3.

The timing of the closing of command valve 250 may preferably be defined as after the valves 200 of section A2 have closed. Here again, the self-closing valves 200 in section A3 gradually close until reaching a closed state. In this closed state of the valves 200, section A3's drip pipes either transfer into a drip irrigation action via e.g. apertures formed along the pipes (if they were not previously dripping) or just go on dripping and/or increase their dripping. This can be seen illustrated by the 'drop' like markings in FIG. 2E seen alongside each drip pipe in section A3 in addition to sections A1 and A2 that remain in irrigation action.

In an aspect of the present invention, the irrigation systems 10, 100 illustrate an approach aimed, inter alia, at limiting an increase in the overall system flow rate during "flushing" of the drip pipes. A smaller variance in system flow rate in principle may provide for a more efficient and cost effective system configuration of e.g. components such as pumps and the like providing flow rate to the system.

If a flow rate of a drip pipe during a "flushing" action is e.g. double than during a drip "irrigation" action, this would result e.g. in system 10 exhibiting a generally similar flow rate during "flushing" and "irrigation". This result is obtained, inter alia, by system 10 being configured to "flush" only half of its drip pipes at a time (i.e. either the 'odd' tagged pipes while keeping the 'even' tagged pipes closed; or the 'even' tagged pipes while keeping the 'odd' tagged pipes closed).

In system 100 this may be achieved by configuring the number of drip pipes to be different in each irrigation section A1, A2, A3. For example, the number of drip pipes per section may satisfy a relationship of A1>A2>A3. By way of an example, if a flow rate of a drip pipe during a "flushing" action is e.g. double than during a drip "irrigation" action, then configuring the number of drip pipes in section A1 to be 57.5% of the overall number of drip pipes in the system— would result in a "flushing" flow rate of section A1 (see FIG. 2B) being 115% of an overall system flow rate when all the drip pipes are irrigating (such as in FIG. 2E).

Figure 2E:
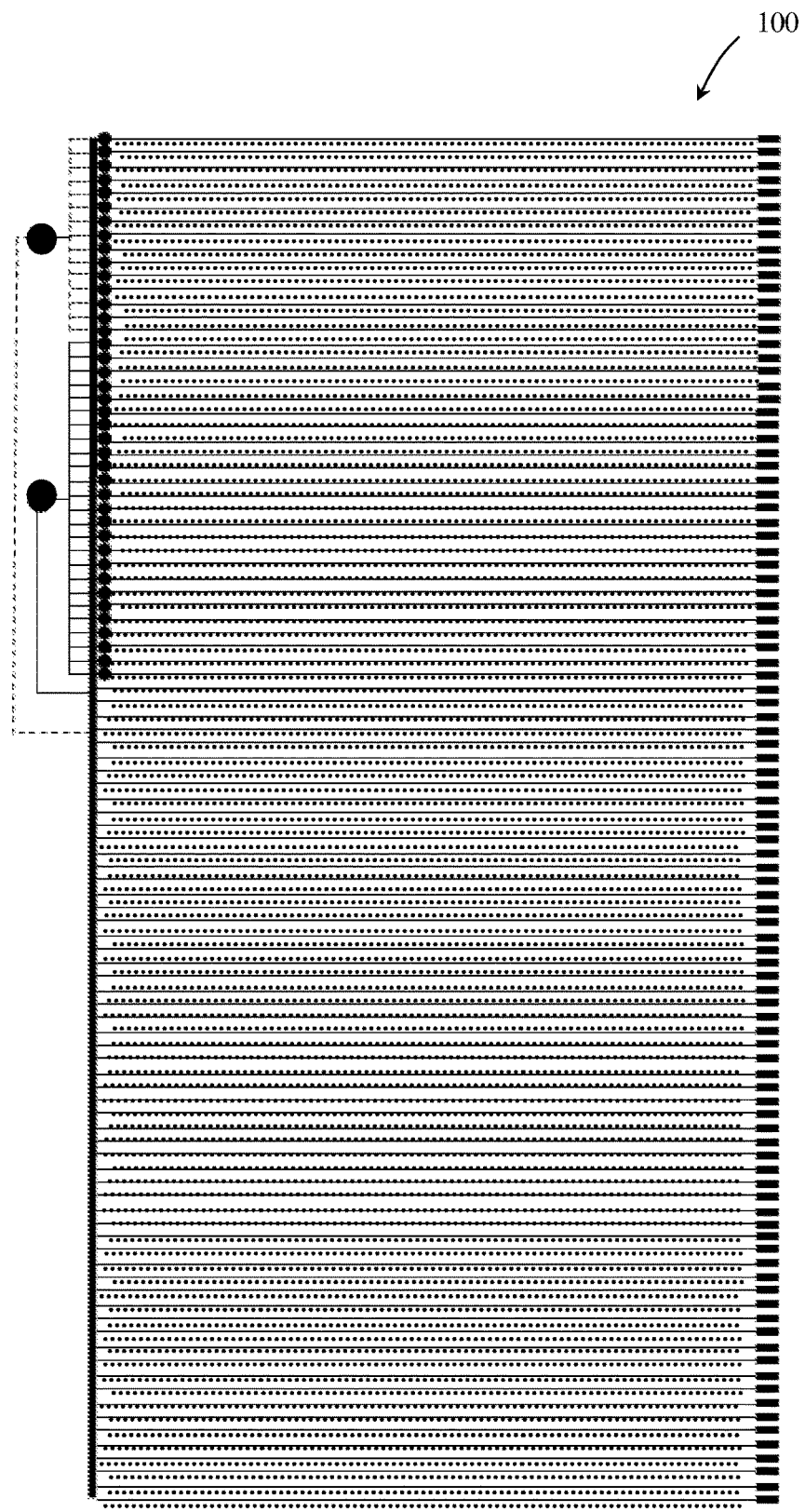

Further to this example, configuring the number of drip pipes in section A2 to be 27.5% of the overall number of drip pipes in the system—would result in a combined "flushing" flow rate of section A2 together with an "irrigation" flow rate of section A1 (see FIG. 2C) reaching a value of 112.5% of an overall system flow rate when all the drip pipes are irrigating (such as in FIG. 2E).

Yet further to this example, configuring the number of drip pipes in section A3 to be 15% of the overall number of drip pipes in the system—would result in a combined "flushing" flow rate of section A3 together with an "irrigation" flow rate of sections A1 and A2 (see FIG. 2D) reaching a value of 115% of an overall system flow rate when all the drip pipes are irrigating (such as in FIG. 2E).

Thus, in the above described example a relatively limited increase of 15% in flow rate may be arrived at during flushing in such an embodiment of system 100. This is in contrary to an increase of about 100% in flow rate that would otherwise be expected, under the parameters of the example discussed above, in an irrigation system not employing the inventive aspects of the present invention.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

Further more, while the present application or technology has been illustrated and described in detail in the drawings and foregoing description, such illustration and description are to be considered illustrative or exemplary and non-restrictive; the technology is thus not limited to the disclosed embodiments. Variations to the disclosed embodiments can be understood and effected by those skilled in the art and practicing the claimed technology, from a study of the drawings, the technology, and the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures can not be used to advantage.

The present technology is also understood to encompass the exact terms, features, numerical values or ranges etc., if in here such terms, features, numerical values or ranges etc. are referred to in connection with terms such as "about, ca., substantially, generally, at least" etc. In other words, "about 3" shall also comprise "3" or "substantially perpendicular" shall also comprise "perpendicular". Any reference signs in the claims should not be considered as limiting the scope.

Although the present embodiments have been described to a certain degree of particularity, it should be understood that various alterations and modifications could be made without departing from the scope of the invention as hereinafter claimed.

The invention claimed is:

1. A drip irrigation system comprising
a distribution pipe,
a plurality of drip irrigation pipes branching off in communication with the distribution pipe, each drip irrigation pipe having an upstream end and a downstream end,
each drip irrigation pipe has a flushing valve coupled to the downstream end thereof,
each of a first number of the drip irrigation pipes has an inlet valve coupled to the upstream end thereof, for communication with the distribution pipe, and
at least one command valve in communication with the distribution pipe and also in communication with each inlet valve coupled to a corresponding one of the first number of drip irrigation pipes, wherein
the command valve is configured to open, in response to a control signal applied to a control port thereof, and
opening of the command valve is configured to close the inlet valves in communication therewith.

2. The system of claim 1, wherein:
the at least one command valve is also in communication with the flushing valves which are coupled to the drip irrigation pipes not among the first number of drip irrigation pipes, and
opening of the command valve is configured to also open the flushing valves in communication with the command valve.

3. The system of claim 2, wherein:
the command valve is configured to close, in response to cessation of the control signal to the control port thereof, and
closing of the command valve is configured to close the flushing valves in communication with the command valve.

4. The system of claim 3, wherein each drip irrigation pipe has an inlet valve coupled to the upstream end thereof, for communication with the distribution pipe.

5. The system of claim 1, wherein a second number of the drip irrigation pipes are in direct communication with the distribution pipe.

6. The system of claim 5, wherein a first section of the system having drip irrigation pipes in direct communication with the distribution pipe includes more drip irrigation pipes than a second section of the system having drip irrigation pipes coupled to the distribution pipe via inlet valves.

7. The system of claim 5, wherein:
each flushing valve has a discharge opening for flushing, and
each flushing valve is of a self-closing type and is configured to gradually close its discharge opening after starting a flushing action.

8. The system of claim 1, wherein each drip irrigation pipe has an inlet valve coupled at an upstream end thereof for communication with the distribution pipe.

9. The system of claim 2, wherein each drip irrigation pipe has an inlet valve coupled at an upstream end thereof for communication with the distribution pipe.

10. A method of irrigation comprising the steps of:
providing an irrigation system comprising a distribution pipe and drip irrigation pipes branching off in communication with the distribution pipe, each drip irrigation pipe comprises a flushing valve coupled to a downstream end thereof, each of a first number of the drip irrigation pipes having an inlet valve coupled to an upstream end thereof for communication with the distribution pipe,
providing at least one command valve in communication with the distribution pipe and also in communication with each inlet valve coupled to a corresponding one of the first number of drip irrigation pipes, and
applying a control signal to a control port of the command valve to open the command valve and allow liquid pressure to be communicated downstream to close the inlet valves in communication therewith.

11. The method of claim 10, wherein:
the at least one command valve is also in communication with the flushing valves which are coupled to the drip irrigation pipes not among the first number of drip irrigation pipes, and
opening of the command valve is configured to also open the flushing valves in communication with the command valve.

12. The method of claim 11, wherein:
the command valve is configured to close, in response to cessation of the control signal to the control port thereof, and
closing of the command valve is configured to close the flushing valves in communication with the command valve.

13. The method of claim 10, wherein:
each drip irrigation pipe has an inlet valve coupled to the upstream end thereof for communication with the distribution pipe, and opening of the command valve is configured to close all of the inlet valves and open all of the flushing valves to flush all the drip irrigation pipes.

14. The method of claim 10, wherein:
a second number of the drip irrigation pipes are in direct communication with the distribution pipe.

15. The method of claim 14, wherein:
a first section of the system having drip irrigation pipes in direct communication with the distribution pipe includes more drip irrigation pipes than a second section of the system having drip irrigation pipes coupled to the distribution pipe via inlet valves.

16. The method of claim 15, wherein:
each flushing valve has a discharge opening for flushing, and
each flushing valve is of a self-closing type and is configured to gradually close its discharge opening after starting a flushing action.

17. The method of claim 16, comprising:
flushing the drip irrigation pipes of the first section at the start of an irrigation cycle; and
flushing the drip irrigation pipes of the second section, after the command valve is closed.

18. The method of claim 17, wherein the command valve is closed, after flushing the drip irrigation pipes of the first section ends.

19. The method of claim 10, wherein:
each flushing valve has a discharge opening for flushing, and
each flushing valve is of a self-closing type and is configured to gradually close its discharge opening after starting a flushing action.

20. A drip irrigation system for irrigating a field, comprising
a plurality of drip irrigation pipes each having an upstream end and a downstream end, and divided into a first set of drip irrigation pipes and a second set of drip irrigation pipes;
each drip irrigation pipe has an inlet valve connected to the upstream end thereof;
each drip irrigation pipe has an outlet valve connected to the downstream end thereof;
each inlet valve and each outlet valve having an inlet, an outlet, and an inlet command port configured to:
prevent flow between its inlet and outlet, when an inlet command signal is applied thereto, and
permit flow between its inlet and outlet, in the absence of an inlet command signal applied thereto;
a distribution pipe communicating with the inlet of each inlet valve at the upstream end;
a first command valve connected to the command ports of the inlet valves belonging to the first set, and also connected to the command ports of the outlet valves belonging to the second set;
a second command valve connected to the command ports of the inlet valves belonging to the second set, and also connected to the command ports of the outlet valves belonging to the first set;
wherein:
in a first irrigation state in which both the first and the second command valves are closed, both sets are configured to drip irrigate;
in a second irrigation state in which the first command valve is open and the second command valve is closed:
the first set is configured to not drip irrigate; and the second set is configured to drip irrigate while simultaneously being flushed with liquid exiting their outlet valves via the outlets;

in a third irrigation state in which the first command valve is closed and the second command valve is open:

the first set is configured to drip irrigate while simultaneously being flushed with liquid exiting their outlet valves via the outlets; and the second set is configured to not drip irrigate.

21. The system of claim 20, wherein the first and second command valves are configured to receive liquid flow from the distribution pipe.

22. The system of claim 20, wherein:

the drip irrigation pipes belonging to the first set alternate with drip irrigation pipes belonging to the second set, along a field being irrigated; and a first command network connects the first command valve to the drip irrigation pipes of the first set; and a second command network connects the second command valve to the drip irrigation pipes of the second set.

23. A drip irrigation system comprising:

a distribution pipe, a plurality of drip irrigation pipes branching off in communication with the distribution pipe, each drip irrigation pipe having an upstream end and a downstream end, the plurality of drip irrigation pipes partitioned into a first set of drip irrigation pipes comprising a first number of drip irrigation pipes, and a second set of drip irrigation pipes comprising a second number of drip irrigation pipes, each drip irrigation pipe has an inlet valve coupled to the upstream end thereof and a flushing valve coupled to the downstream end thereof, a first command network comprising a first command valve in communication with the inlet valves coupled to the first set of drip irrigation pipes, and in communication with the flushing valves coupled to the second set of drip irrigation pipes, and a second command network comprising a second command valve in communication with the inlet valves coupled to the second set of drip irrigation pipes, and in communication with the flushing valves coupled to the first set of drip irrigation pipes, wherein:

the first and second command valves each comprise a control port; and each of the first and second command valves is configured to open, in response to a control signal received at its respective control port.

24. The drip irrigation system according to claim 23, wherein:

the inlet valves are normally open;

the flushing valves are normally closed; and the first and second command valves are normally closed.

25. The drip irrigation system according to claim 24, occupying a first irrigation state in which:

no control signal is applied to either or both of the control ports, and both control ports remain closed;

the inlet valves all remain open;

the flushing valves all remain closed; and the first and second sets of drip irrigation pipes are configured to irrigate.

26. The drip irrigation system according to claim 24, occupying a second irrigation state in which:

a control signal is applied to the control port of the first control valve, such that the first control valve is open;

no control signal is applied to the control port of the second control valve, such that the second control valve remains closed;

the inlet valves coupled to the first set of drip irrigation lines are closed such that the first set of irrigation lines are configured to not irrigate;

the inlet valves coupled to the second set of drip irrigation lines remain open and the flushing valves coupled to the second set of drip irrigation lines are open, such that the second set of drip irrigation lines are configured to irrigate and be flushed.

27. The drip irrigation system according to claim 24, occupying a third irrigation state in which:

no control signal is applied to the control port of the first control valve, such that the first control valve remains closes;

a control signal is applied to the control port of the second control valve, such that the second control valve is open;

the inlet valves coupled to the second set of drip irrigation lines are closed such that the second set of irrigation lines are configured to not irrigate;

the inlet valves coupled to the first set of drip irrigation lines remain open and the flushing valves coupled to the first set of drip irrigation lines are open, such that the first set of drip irrigation lines are configured to irrigate and be flushed.

* * * * *